(12) United States Patent
Kim et al.

(10) Patent No.: US 8,970,524 B2
(45) Date of Patent: Mar. 3, 2015

(54) TOUCH SENSOR INTEGRATED TYPE DISPLAY DEVICE

(75) Inventors: Cheolse Kim, Daegu (KR); Sunjung Lee, Seoul (KR); Sangsoo Hwang, Seoul (KR)

(73) Assignee: LG Display Co., Ltd., Seoul (KR)

( * ) Notice: Subject to any disclaimer, the term of this patent is extended or adjusted under 35 U.S.C. 154(b) by 194 days.

(21) Appl. No.: 13/448,012

(22) Filed: Apr. 16, 2012

(65) Prior Publication Data

US 2013/0033439 A1 Feb. 7, 2013

(30) Foreign Application Priority Data

Aug. 4, 2011 (KR) .......... 10-2011-0077642

(51) Int. Cl.
 *G06F 3/041* (2006.01)
 *G02F 1/1333* (2006.01)
 *G06F 3/044* (2006.01)
 *G02F 1/1343* (2006.01)

(52) U.S. Cl.
 CPC ............ *G02F 1/13338* (2013.01); *G06F 3/044* (2013.01); *G02F 2001/134318* (2013.01); *G02F 2201/121* (2013.01); *G06F 3/0412* (2013.01); *G06F 2203/04103* (2013.01)
 USPC ........... 345/173; 345/174; 349/141; 349/106; 349/129

(58) Field of Classification Search
 CPC ............... G09G 2300/0426; G09G 2300/041; G09G 2300/0421; G09G 2300/04; G02F 1/134363; G02F 2001/134318; G02F 1/133753; G06F 3/041
 See application file for complete search history.

(56) References Cited

U.S. PATENT DOCUMENTS

| 2007/0070281 | A1* | 3/2007 | Choi | 349/141 |
| 2010/0194707 | A1* | 8/2010 | Hotelling et al. | 345/173 |
| 2010/0302202 | A1* | 12/2010 | Takeuchi et al. | 345/174 |
| 2011/0234513 | A1* | 9/2011 | Pan et al. | 345/173 |
| 2013/0300953 | A1 | 11/2013 | Hotelling et al. | |

FOREIGN PATENT DOCUMENTS

CN 101825966 A 9/2014

* cited by examiner

*Primary Examiner* — Gerald Johnson
(74) *Attorney, Agent, or Firm* — Birch, Stewart, Kolasch & Birch, LLP

(57) ABSTRACT

A touch sensor integrated type display and a method of forming the same are discussed. According to an embodiment, the touch sensor integrated type display device includes a plurality of gate lines and a plurality of data lines formed on a substrate to cross each other; a display area including a plurality of pixel electrodes for displaying images; a common electrode including at least two touch driving electrodes overlapping the plurality of pixel electrodes and at least one touch sensing electrode positioned adjacent to the at least two touch driving electrodes, for recognizing a touch input to the display area; at least one first signal line electrically connected to the at least two touch driving electrodes; and at least one second signal line electrically connected to the at least one touch sensing electrode, and formed over at least one of the data lines.

20 Claims, 7 Drawing Sheets

TOUCH SENSOR INTEGRATED TYPE DISPLAY DEVICE

This application claims the priority benefit of Korean Patent Application No. 10-2011-0077642 filed on Aug. 4, 2011, which is incorporated herein by reference for all purposes as if fully set forth herein.

BACKGROUND OF THE INVENTION

1. Field of the Invention

Embodiments of the invention relate to a touch sensor integrated type display.

2. Discussion of the Related Art

A touch sensor is installed in display devices such as a liquid crystal display, a field emission display, a plasma display panel, an electroluminescent display, and an electrophoresis display. The touch sensor is a kind of input device capable of receiving predetermined information or input from a user when the user touches a touch panel having the touch sensor.

The touch sensor used in the display devices may be classified into an add-on type touch sensor, an on-cell type touch sensor, and an integrated type (or in-cell type) touch sensor depending on its structure. The add-on type touch sensor is configured such that the display device and the add-on type touch sensor are individually manufactured and then the add-on type touch sensor is attached to an upper substrate of the display device. The on-cell type touch sensor is configured such that components of the on-cell type touch sensor are directly formed on the surface of the upper substrate of the display device. The in-cell type touch sensor is configured such that the in-cell type touch sensor is embedded in the display device to thereby achieve thin profile of the display device and to increase the durability of the display device.

However, because the add-on type touch sensor has the structure in which the completed add-on type touch sensor is mounted on the display device, a thickness of the display device increases. Further, the visibility of the display device having the add-on type touch sensor is reduced because of a reduction in a brightness of the display device.

On the other hand, because the on-cell type touch sensor has the structure in which the on-cell type touch sensor is formed on the surface of the upper substrate of the display device, the on-cell type touch sensor shares the upper substrate with the display device. Therefore, a thickness of the display device having the on-cell type touch sensor is less than a thickness of the display device having the add-on type touch sensor. However, the entire thickness of the display device having the on-cell type touch sensor increases because of a touch driving electrode layer, a touch sensing electrode layer, and an insulating layer for insulating the touch driving electrode layer and the touch sensing electrode layer, which constitute the on-cell type touch sensor. Further, the number of processes and the manufacturing cost in the on-cell type touch sensor increase.

The in-cell type touch sensor can address the problems associated with the add-on type touch sensor and the on-cell type touch sensor because of the advantages of the thin profile and the durability improvement. Examples of the in-cell type touch sensor include a light type touch sensor, a capacitive touch sensor, etc.

In the light type touch sensor, a light sensing layer is formed on a thin film transistor (TFT) array substrate of the display device, and it is possible to recognize light reflected by an object existing in a touched portion using light or infrared light from a backlight unit. The light type touch sensor shows a relatively stable driving performance in dark surroundings, but light stronger than the reflected light acts as a noise in bright surroundings. The light type touch sensor may erroneously recognize a non-touch operation as a touch operation even in the slightly bright surroundings because an intensity of light reflected by the actual touch operation is very weak. In particular, the light type touch sensor may not readily recognize the touch operation because an intensity of light in the surroundings exposed to solar light is strong.

Examples of the capacitive touch sensor include a self capacitive touch sensor and a mutual capacitive touch sensor. The mutual capacitive touch sensor divides a common electrode of the display device into touch driving electrode regions and touch sensing electrode regions to form mutual capacitances between the touch driving electrode regions and the touch sensing electrode regions. Hence, the mutual capacitive touch sensor measures changes in the mutual capacitances generated in a touch operation, thereby recognizing the touch operation.

In the mutual capacitive touch sensor, the common electrode is divided into a plurality of touch cells formed on the same layer, and each of the touch cells is divided into a touch driving electrode and a touch sensing electrode. As described above, because the touch driving electrodes and the touch sensing electrodes are formed on the same layer and the touch driving electrodes should not be electrically connected to the touch sensing electrodes, touch driving lines designated for connecting the touch driving electrodes to each other and separate touch sensing lines designated for connecting the touch sensing electrodes to each other are needed. For this, in the related art, the touch driving lines are formed of the same metal as gate lines when the gate lines of the display device were formed, thereby connecting the touch driving electrodes to one another in a x-axis direction. Further, the touch sensing lines are formed of metal formed on a layer different from the formation layer of the touch driving lines, the touch driving electrodes, and the touch sensing electrodes, thereby connecting the touch sensing electrodes to one another in a y-axis direction.

However, when the touch driving lines and the touch sensing lines are formed on the different layers, the design of a TFT array was complicated, and an aperture ratio is reduced due to the disposition of the touch sensing electrodes.

Accordingly, there is a need for a touch sensor integrated type display device capable of addressing the problems of the above-described kinds of touch sensors.

SUMMARY OF THE INVENTION

The present invention provides a touch sensor integrated type display device and a method for forming and operating the same, which address the limitations and disadvantages associated with the related art.

Embodiments of the invention provide a touch sensor integrated type display device capable of reducing its thickness and improving the durability by sharing a touch sensing element for recognizing a touch operation with a component of the display.

Embodiments of the invention also provide a touch sensor integrated type display device capable of increasing an aperture ratio by disposing signal lines for touch recognition so that the signal lines overlap data lines.

In one aspect, there is a touch sensor integrated type display device including a plurality of gate lines and a plurality of data lines which are formed on a substrate to cross each other, a plurality of pixel electrodes which are formed in a plurality of areas defined by a crossing of the gate lines and the data lines, a common electrode including at least two touch driving electrodes overlapping the plurality of pixel electrodes and at least one touch sensing electrode positioned adjacent to the at least two touch driving electrodes, a plurality of first signal lines, each of which is connected to the at least two touch driving electrodes, the first signal lines being positioned parallel to one another in a first direction, and a plurality of second signal lines, each of which is connected to the at least one touch sensing electrode, the second signal lines being positioned in a second direction crossing the first signal lines and overlapping the data lines.

In another aspect, there is a touch sensor integrated type display device including a gate line and a plurality of first signal lines formed on a substrate, a gate insulating layer formed on a front surface of the substrate on which the gate line and the plurality of first signal lines are formed, a data line which is formed on the gate insulating layer to cross the gate line, a thin film transistor which is formed on the gate insulating layer and includes a source electrode connected to the data line, a pixel electrode which is formed on the gate insulating layer so that the pixel electrode is connected to a drain electrode of the thin film transistor, and is formed in an area defined by a crossing of the gate line and the data line, an interlayer dielectric formed on the gate insulating layer on which the data line, the thin film transistor, and the pixel electrode are formed, a common electrode formed on the interlayer dielectric, the common electrode including at least two touch driving electrodes and at least one touch sensing electrode separated from the at least two touch driving electrodes, and a plurality of second signal lines overlapping the data line, wherein the at least two touch driving electrodes are connected to the plurality of first signal lines through a contact hole formed in the interlayer dielectric, wherein the at least one touch sensing electrode includes a plurality of second signal lines which are formed on the at least one touch sensing electrode, cross the plurality of first signal lines, and overlap the data line.

According to an embodiment, the present invention provides a touch sensor integrated type display device includes a plurality of gate lines and a plurality of data lines formed on a substrate to cross each other; a display area including a plurality of pixel electrodes for displaying images; a common electrode including at least two touch driving electrodes overlapping the plurality of pixel electrodes and at least one touch sensing electrode positioned adjacent to the at least two touch driving electrodes, for recognizing a touch input to the display area; at least one first signal line electrically connected to the at least two touch driving electrodes; and at least one second signal line electrically connected to the at least one touch sensing electrode, and formed over at least one of the data lines.

According to an embodiment, the present invention provides a touch sensor integrated type display device comprising: a gate line and at least one first signal line formed on a substrate; a gate insulating layer formed on the gate line; a data line formed on the gate insulating layer to cross the gate line; a thin film transistor formed on the gate insulating layer and including a source electrode connected to the data line and a drain electrode; a pixel electrode formed on the gate insulating layer so that the pixel electrode is connected to the drain electrode of the thin film transistor, and is formed in an area defined by a crossing of the gate line and the data line; an interlayer dielectric layer formed on the gate insulating layer on which the data line, the thin film transistor, and the pixel electrode are formed; a common electrode formed on the interlayer dielectric layer, the common electrode including at least two touch driving electrodes and at least one touch sensing electrode separating the at least two touch driving electrodes, wherein the at least two touch driving electrodes are connected to the at least one first signal line through contact holes defined by the interlayer dielectric layer; and at least one second signal line formed on the at least one touch sensing electrode and overlapping the data line.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention. In the drawings.

DETAILED DESCRIPTION OF THE EMBODIMENTS

Reference will now be made in detail to embodiments of the invention, examples of which are illustrated in the accompanying drawings. Wherever possible, the same reference numbers will be used throughout the drawings to refer to the same or like parts. It will be paid attention that detailed description of known arts will be omitted if it is determined that the arts can mislead the embodiments of the invention.

A touch sensor integrated type display device according to an example embodiment of the invention is described below in detail with reference to FIGS. 1 to 7B.

Figure 1:
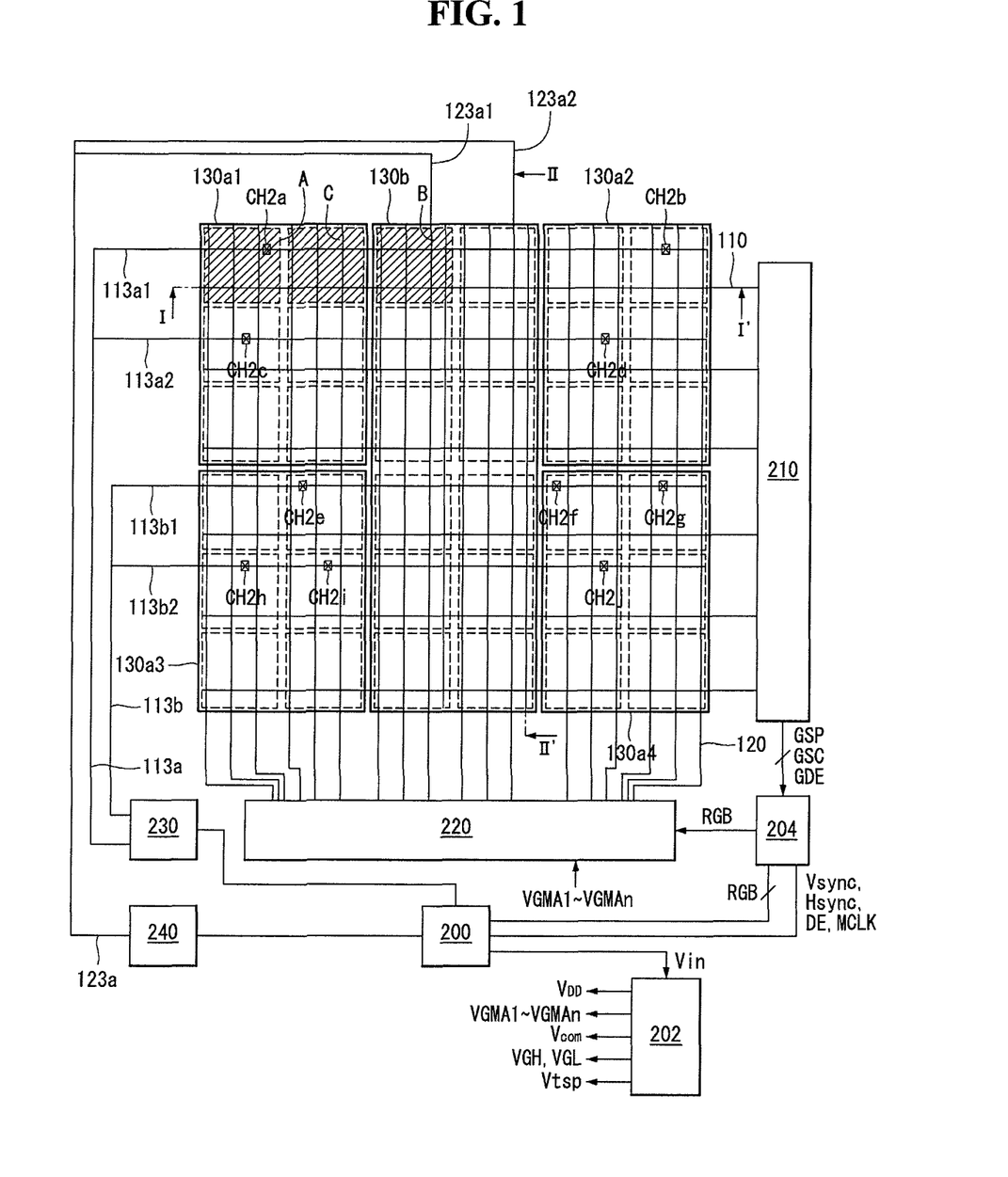
FIG. 1 schematically illustrates a touch sensor integrated type display device according to an example embodiment of the invention.
Figure 2:
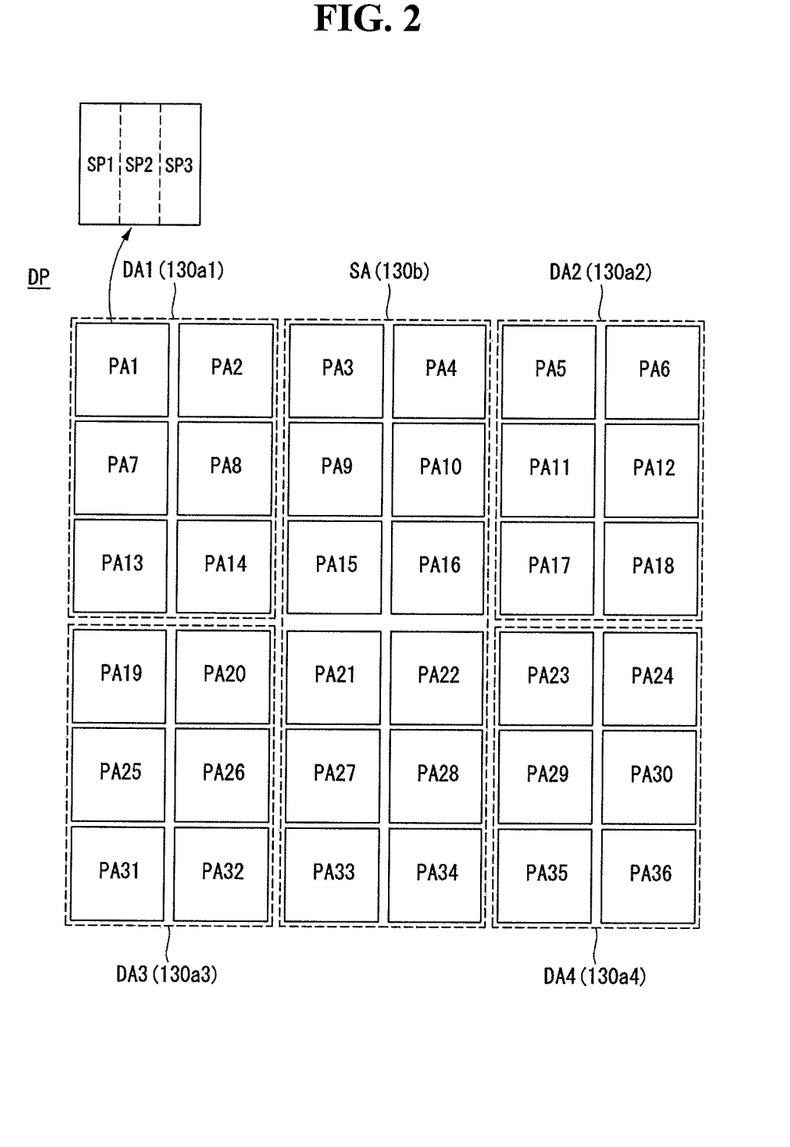
FIG. 2 illustrates a relationship between a pixel area, a driving area for touch recognition, and a sensing area in the touch sensor integrated type display device shown in FIG. 1.
Figure 3:
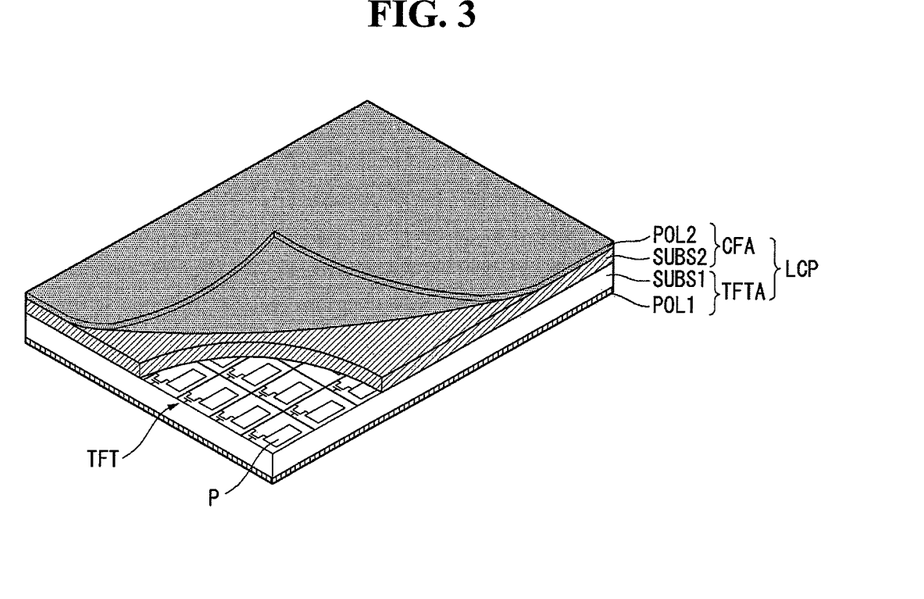
FIG. 3 is a schematic perspective view of an example of a display panel according to an embodiment of the present invention.

FIG. 1 schematically illustrates a touch sensor integrated type display device according to an example embodiment of the invention. FIG. 2 illustrates a relationship between a pixel area, a driving area for touch recognition, and a sensing area in the touch sensor integrated type display device shown in FIG. 1. FIG. 3 is a schematic perspective view of an example of the display panel of FIG. 1.

In the following description, a touch sensor integrated type liquid crystal display device is used as an example of the touch sensor integrated type display. However, the inventive concept of the present invention is equally applicable to other types of touch sensor integrated type displays.

As shown in FIGS. 1 to 3, a touch sensor integrated type liquid crystal display device (hereinafter simply referred to as a "display device") according to an example embodiment of the invention includes a display area DP including a plurality of pixel areas PA1 to PA36 and a non-display area formed outside the display area DP. The plurality of pixel areas PA1 to PA36 are defined by a crossing of a plurality of gate lines 110 and a plurality of date lines 120 and display information such as characters, images, and moving pictures. The gate lines 110 are disposed parallel to each other and the data lines 120 are disposed parallel to each other. The data lines 120 cross over the gate lines 110 to form a matrix configuration. The non-display area includes various controllers for controlling the display area DP and recognizing a touch operation. All components of the display device are operatively coupled and configured.

The display device of FIG. 1 can have a configuration as shown in FIG. 3. As shown in FIG. 3, the display device can include a liquid crystal display panel LCP that includes a color filter array CFA and a thin film transistor (TFT) array TFTA with a liquid crystal layer interposed between them.

The TFT array TFTA includes the plurality of gate lines 110, which are formed parallel to one another on a first substrate SUBS1 in a first direction (for example, an x-axis direction in the embodiment of the invention), the plurality of data lines 120, which are formed parallel to one another in a second direction (for example, a y-axis direction in the embodiment of the invention) to cross the plurality of gate lines 110, TFTs formed at crossings of the gate lines 110 and the data lines 120, a plurality of pixel electrodes P for charging liquid crystal cells to a data voltage, and common electrodes 130a1, 130a2, 130a3, 130a4, and 130b positioned opposite the plurality of pixel electrodes P. The common electrodes 130a1, 130a2, 130a3, 130a4 are referred to herein as first common electrodes, and the common electrode 130b is referred to herein as a second common electrode.

The color filter array CFA includes black matrixes and color filters, which are formed on a second substrate SUBS2. Polarizing plates POL1 and POL2 are respectively attached to the first substrate SUBS1 and the second substrate SUBS2 of the liquid crystal display panel LCP. Alignment layers for setting a pre-tilt angle of liquid crystals are respectively formed on the inner surfaces of the first substrate SUBS1 and the second substrate SUBS2 contacting the liquid crystals. A column spacer may be formed between the first substrate SUBS1 and the second substrate SUBS2 to keep cell gaps of the liquid crystal cells constant.

A backlight unit is disposed under the TFT array TFTA. The backlight unit includes one light source or a plurality of light sources and uniformly irradiates light onto the TFT array TFTA and the color filter array CFA. The backlight unit may be implemented as one of an edge type backlight unit and a direct type backlight unit. The light sources of the backlight unit may include one or at least two of a hot cathode fluorescent lamp (HCFL), a cold cathode fluorescent lamp (CCFL), an external electrode fluorescent lamp (EEFL), and a light emitting diode (LED).

The common electrodes 130a1, 130a2, 130a3, 130a4, and 130b may be formed on the second substrate SUBS2 if the display operates in a vertical electric field driving manner such as a twisted nematic (TN) mode and a vertical alignment (VA) mode. In another example, the common electrodes 130a1, 130a2, 130a3, 130a4, and 130b may be formed on the first substrate SUBS1 along with the pixel electrodes P if the display operates in a horizontal electric field driving manner such as an in-plane switching (IPS) mode and a fringe field switching (FFS) mode. Here, the embodiment of the invention describes the common electrodes 130a1, 130a2, 130a3, 130a4, and 130b as operating in the horizontal electric field driving manner as an example. The common electrodes 130a1, 130a2, 130a3, 130a4, and 130b cooperates with the pixel electrodes of the TFT array TFTA to drive liquid crystal cells, whereby images are displayed on the display area DP.

Further, according to the present invention, the common electrodes 130a1, 130a2, 130a3, 130a4, and 130b also function as touch driving electrodes and touch sensing electrodes capable of recognizing a touch position when a touch input on the display area DP is generated.

The non-display area includes a host controller 200, a power supply unit 202, a timing controller 204, a gate driver 210, a data driver 220, a touch driver 230, and a touch sensing driver 240. In the embodiment of the invention, the host controller 200 and the power supply unit 202 form an integral body along with the display device. Alternatively, the host controller 200 and the power supply unit 202 may be individually configured separately from the display device.

The TFT array TFTA includes the plurality of pixel areas PA1 to PA36 defined by the crossing of the gate lines 110 and the date lines 120 as shown in FIG. 2. Each of the plurality of pixel areas PA1 to PA36 includes a plurality of subpixel areas SP1, SP2, and SP3. The TFT array TFTA includes the plurality of first common electrodes 130a1, 130a2, 130a3, and 130a4 and the second common electrode 130b. The plurality of first common electrodes 130a1, 130a2, 130a3, and 130a4 and the second common electrode 130b are alternately disposed in the first direction and are formed separately from each other. The plurality of first common electrodes 130a1, 130a2, 130a3, and 130a4 and the second common electrode 130b are disposed adjacent to each other in the second direction. In the embodiment of the invention, one second common electrode 130b is shown, but the invention is not limited thereto. As such, a plurality of second common electrodes 130b may be formed in the display device.

In one example, to ensure that a touch input to the display area DP can be accurately processed, the embodiment of the invention describes four first common electrodes 130a1, 130a2, 130a3, and 130a4 and one second common electrode 130b corresponding to the 36 (=6×6) pixel areas PA1 to PA36 for the sake of brevity and ease of explanation. Further, each of the first common electrodes 130a1, 130a2, 130a3, and 130a4 has the size corresponding to the 6(=2×3) pixel areas, and the second common electrode 130b has the size corresponding to the 12(=2×6) pixel areas. Thus, the first common electrode 130a1 has the size corresponding to the 6 pixel areas PA1, PA2, PA7, PA8, PA13, and PA14 positioned adjacent to one another side to side and up and down; the first common electrode 130a2 has the size corresponding to the 6 pixel areas PA5, PA6, PA11, PA12, PA17, and PA18 positioned adjacent to one another side to side and up and down; the first common electrode 130a3 has the size corresponding to the 6 pixel areas PA19, PA20, PA25, PA26, PA31, and PA32 positioned adjacent to one another side to side and up and down; and the first common electrode 130a4 has the size corresponding to the 6 pixel areas PA23, PA24, PA29, PA30, PA35, and PA36 positioned adjacent to one another side to side and up and down. Further, the second common electrode 130b has the size corresponding to the 12 pixel areas PA3, PA4, PA9, PA10, PA15, PA16, PA21, PA22, PA27, PA28, PA33, and PA34 positioned adjacent to one another side to side and up and down.

The size and the number of each of the first and second common electrodes described in the embodiment of the invention are only an example out of many for the sake of brevity and ease of explanation. Other sizes and numbers may be used and are part of the present invention. For example, the embodiment of the invention may divide the plurality of pixel areas arranged in the first and second directions into at least two groups, and may form the first common electrode having the size corresponding to the pixel areas belonging to each group. Further, the embodiment of the invention may form the plurality of pixel areas arranged in one direction of the first and second directions as one group, and may form the second common electrode having the size corresponding to the pixel areas belonging to the one group.

Accordingly, the size and the number of each of the first and second common electrodes may be properly changed in consideration of an area of a touched portion using a user's finger, etc. and the size of the display device (for example, MP3, PDA, PMP, smart phone, notebook computer, netbook, large-sized display device, etc.). For example, if the size of one pixel area applied to the current display device is about 100×100 μm, each of the first common electrodes 130a1, 130a2, 130a3, and 130a4 may have the size of the 50×50 pixel areas (i.e., about 5×5 mm) in consideration of the touch operation using the user's finger.

The second common electrode 130b serves as a touch sensing electrode when the touch operation is generated. The second common electrode 130b is positioned between the first common electrodes 130a1 and 130a2, which are positioned on a first row in the first direction, and between the first common electrodes 130a3 and 130a4, which are positioned on a second row in the first direction. Hence, the second common electrode 130b is arranged in a direction crossing the first common electrodes 130a1, 130a2, 130a3, and 130a4.

As described above, the size of each of the first common electrodes 130a1, 130a2, 130a3, and 130a4 and the second common electrode 130b may be properly adjusted in consideration of the size of the pixel area and an area of a touched portion using the user's finger, etc., and thus may have the size corresponding to several to hundreds of pixel areas. Further, the number of first common electrodes and the number of second common electrodes may be properly adjusted depending on the size of the display device used so that a proper touch operation can be carried out using the display device.

In the embodiment of the invention, the first common electrodes 130a1, 130a2, 130a3, and 130a4 and the second common electrode 130b form an electric field along with the pixel electrodes P, thereby driving the liquid crystals to display images. In addition, the first common electrodes 130a1, 130a2, 130a3, and 130a4 and the second common electrode 130b serve respectively as a touch driving electrode and a touch sensing electrode capable of recognizing a touch position when a touch input to the display device is made. Thus, the first common electrodes 130a1, 130a2, 130a3, and 130a4 and the second common electrode 130b may be considered as the touch driving electrodes and the touch sensing electrode, respectively. FIG. 2 shows that areas (each including the plurality of pixel areas) of the first common electrodes 130a1, 130a2, 130a3, and 130a4 and the second common electrode 130b are respectively referred to as first to fourth touch driving areas DA1 to DA4 and a first touch sensing area SA for the sake of brevity and ease of reading.

Because the first common electrodes 130a1, 130a2, 130a3, and 130a4 and the second common electrode 130b also serve as electrodes for driving the liquid crystals to display images, the first common electrodes 130a1, 130a2, 130a3, and 130a4 and the second common electrode 130b may be formed of a transparent material. For instance, the first and second common electrodes 130a1, 130a2, 130a3, 130a4, and 130b may be formed of a transparent conductive oxide material such as indium tin oxide (ITO) and indium zinc oxide (IZO). In this instance, however, resistances of the first and second common electrodes 130a1, 130a2, 130a3, 130a4, and 130b formed of the transparent conductive oxide material may be greater than resistances of the first and second common electrodes 130a1, 130a2, 130a3, 130a4, and 130b when they are formed of a conductive metal material. Because an increase in the resistance may cause a loss of the touch signals and an increase in a time constant of the capacitance, a touch performance may be affected. Thus, the increase in the resistance generated by the material used in the first and second common electrodes 130a1, 130a2, 130a3, 130a4, and 130b has to be prevented or reduced.

To address this, according to the present invention, the first common electrodes 130a1, 130a2, 130a3, and 130a4, separated by the second common electrode 130b, are connected to one another by at least one first common line (also referred to herein as a first signal line). Similarly, the second common electrode 130b (especially if multiple second common electrodes are used) is connected by at least one second common line (also referred to herein as a second signal line).

In the embodiment of the invention, the first common electrodes 130a1, 130a2, 130a3, and 130a4 are connected to each other using first common lines 113a1, 113a2, 113b1, and 113b2, and the second common electrode 130b is connected to second common lines 123a1 and 123a2, so as to achieve the resistance reduction and an improvement of the touch performance in the first common electrodes 130a1, 130a2, 130a3, and 130a4 and the second common electrode 130b.

More specifically, as shown in FIGS. 1 and 2, the first common electrodes 130a1 and 130a2 formed in the first and second touch driving areas DA1 and DA2 on the first row in the first direction are electrically connected to each other using the two first common lines 113a1 and 113a2. Further, the first common electrodes 130a3 and 130a4 formed in the third and fourth touch driving areas DA3 and DA4 on the second row in the first direction are electrically connected to each other using the two first common lines 113b1 and 113b2. The second common electrode 130b formed in the first touch sensing area SA in the second direction is electrically connected to the second common lines 123a1 and 123a2.

Figure 4A:
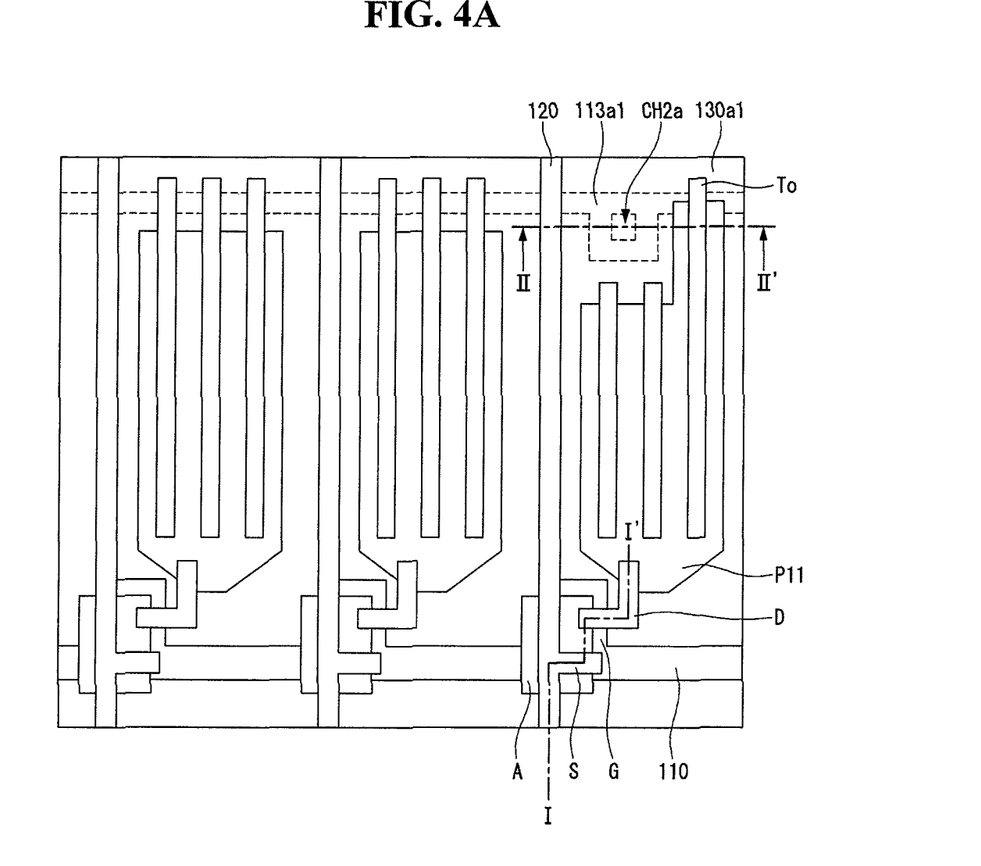
FIG. 4A is an enlarged plane view of a portion 'A' (pixel area PA1) shown in FIG. 1.
Figure 4B:
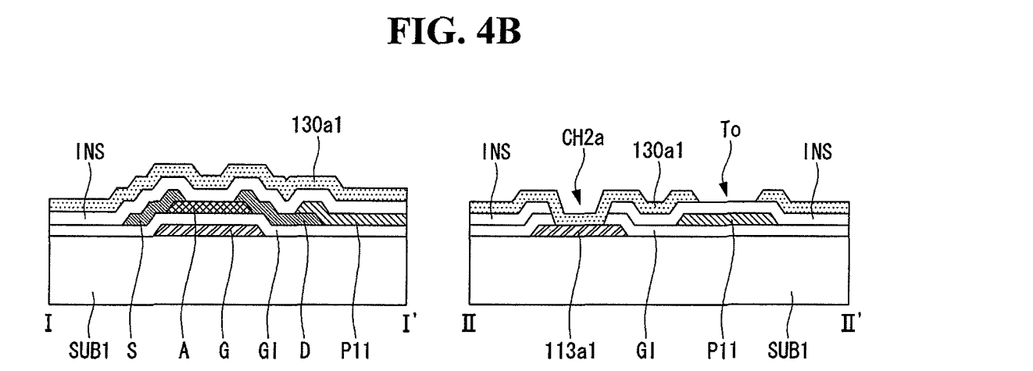
FIG. 4B is a cross-sectional view taken along lines I-I' and II-II' shown in FIG. 4A.
Figure 5A:
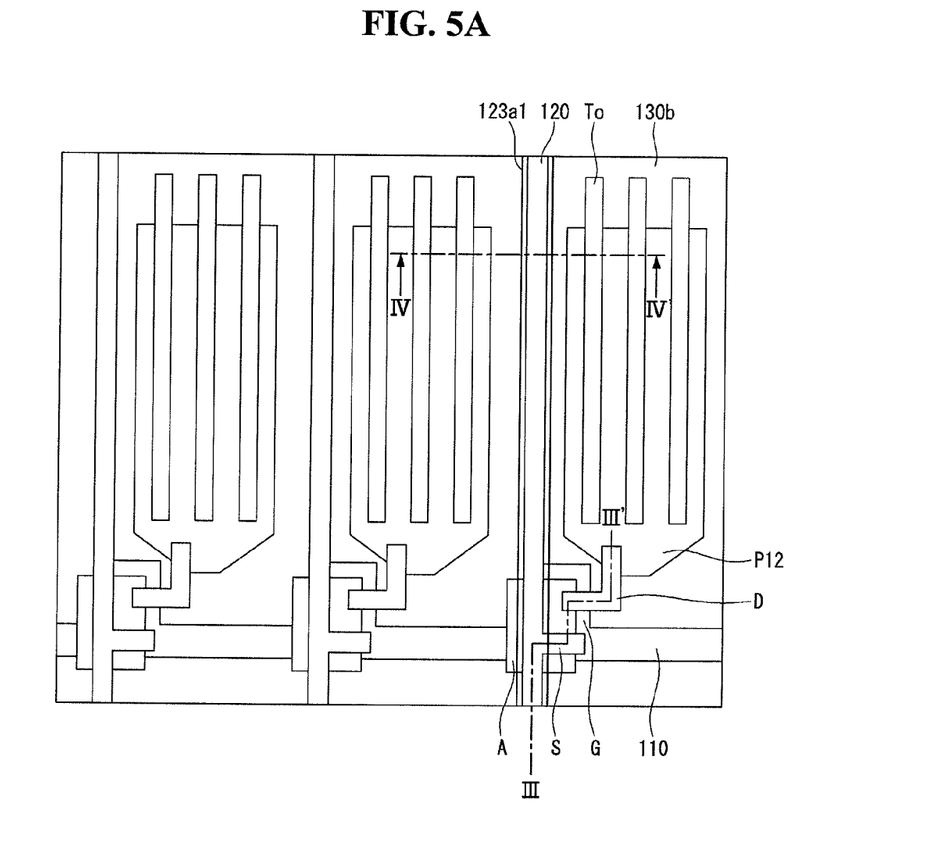
FIG. 5A is an enlarged plane view of a portion 'B' (pixel area PA3) shown in FIG. 1.
Figure 5B:
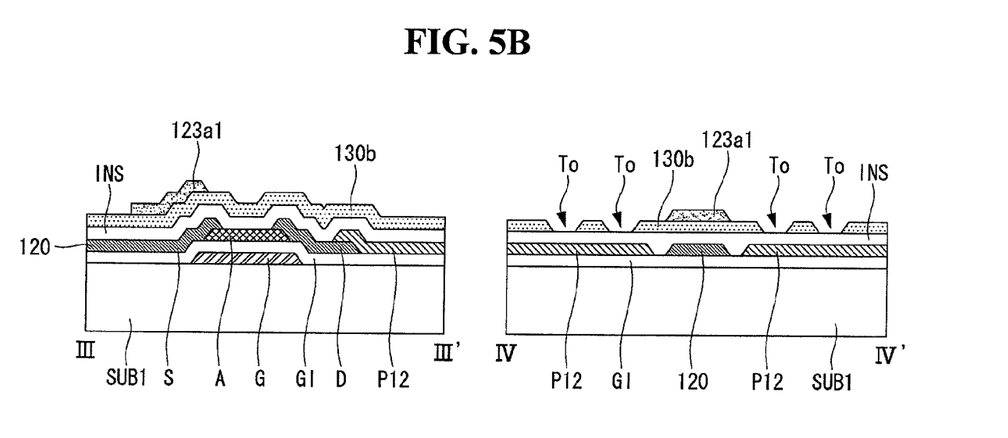
FIG. 5B is a cross-sectional view taken along lines III-III' and IV-IV' shown in FIG. 5A.
Figure 6A:
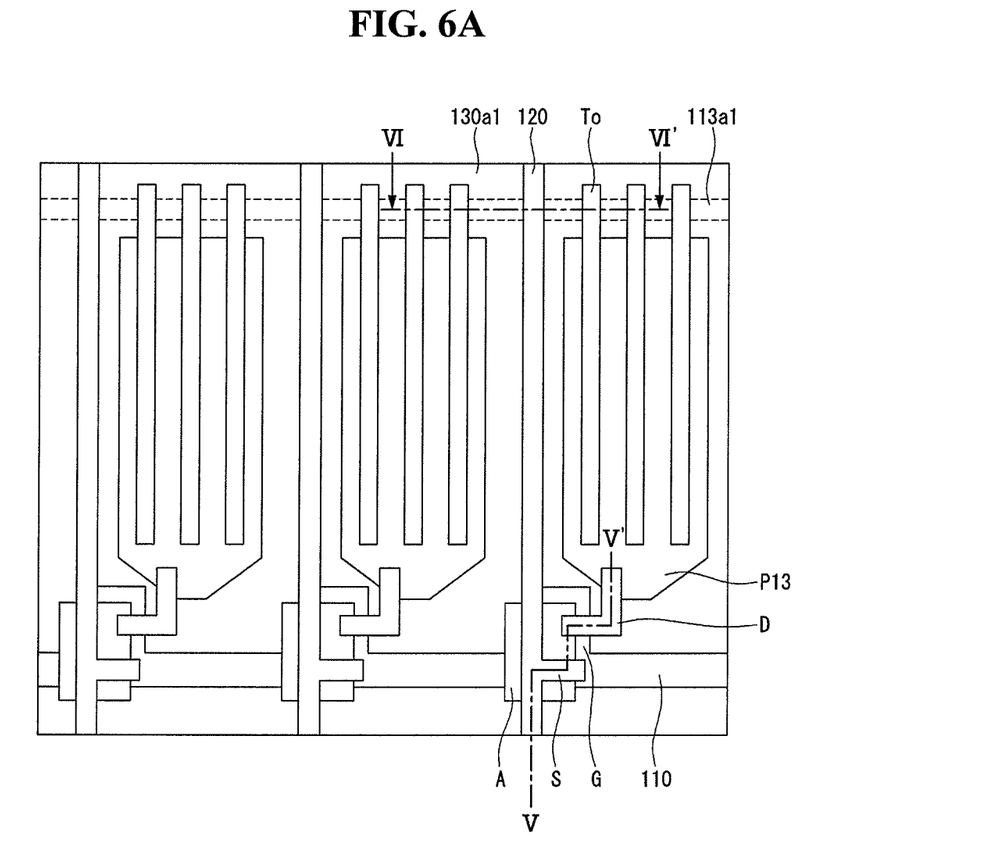
FIG. 6A is an enlarged plane view of a portion 'C' (pixel area PA2) shown in FIG. 1.
Figure 6B:
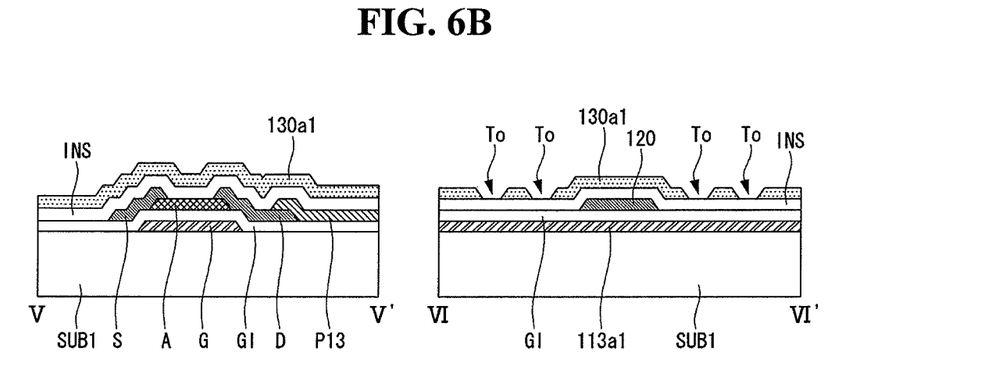
FIG. 6B is a cross-sectional view taken along lines V-V' and VI-VI' shown in FIG. 6A.

A connection relation between the first common electrodes 130a1, 130a2, 130a3, and 130a4 and the first common lines 113a1, 113a2, 113b1, and 113b2 and a connection relation between the second common electrode 130b and the second common lines 123a1 and 123a2 are described in detail below with reference to FIG. 1 and FIGS. 4A to 6B. FIG. 4A is an enlarged plane view of a portion 'A' (the pixel area PA1 of FIG. 2) shown in FIG. 1, and FIG. 4B is a cross-sectional view taken along lines I-I' and II-II' shown in FIG. 4A. FIG. 5A is an enlarged plane view of a portion 'B' (the pixel area PA3 of FIG. 2) shown in FIG. 1, and FIG. 5B is a cross-sectional view taken along lines III-III' and IV-IV' shown in FIG. 5A. FIG. 6A is an enlarged plane view of a portion 'C' (the pixel area PA2 of FIG. 2) shown in FIG. 1, and FIG. 6B is a cross-sectional view taken along lines V-V' and VI-VI' shown in FIG. 6A.

As shown in FIGS. 1, 2, 4A, 4B, 6A, and 6B, the first common lines 113a1, 113a2, 113b1, and 113b2 are formed on the first substrate SUBS1 and respectively cross the pixel areas PA1-PA6, PA7-PA12, PA19-PA24, and PA25-PA30 in the first direction. The first common lines 113a1, 113a2, 113b1, and 113b2 are connected to the first common electrodes 130a1 and 130a2 formed on an interlayer dielectric INS through first contact holes CH2a, CH2b, CH2c, CH2d, CH2e, CH2f, CH2g, CH2h, CH2i, and CH2j passing through a gate insulating layer GI and the interlayer dielectric INS, which are sequentially formed on the first common lines 113a1, 113a2, 113b1, and 113b2.

More specifically, the first common line 113a1 is connected to the first common electrode 130a1 through the first contact hole CH2a formed in the subpixel area SP3 of the pixel area PA1 belonging to the first touch driving area DA1, and is connected to the first common electrode 130a2 through the first contact hole CH2b formed in the subpixel area SP2 of the pixel area PA6 belonging to the second touch driving area DA2. Hence, the first common line 113a1 electrically connects the first common electrodes 130a1 and 130a2 to each other, which are positioned on the first row and are separated by the second common electrode 130b. The first common lines 113a1 and 113a2 are connected to a touch driving line 113a and receive a pulse voltage Vtsp from the touch driver 230.

As shown in FIGS. 1, 2, 5A, and 5B, the second common lines 123a1 and 123a2 are formed on the second common electrode 130b and respectively cross a part including the pixel areas PA3, PA9, PA15, PA21, PA27 and PA33 and a part including the pixel areas PA4, PA10, PA16, PA22, PA28, and PA34 in the second direction. The second common lines 123a1 and 123a2 are connected to the second common electrode 130b.

The configuration of the pixel area PA1 of the first touch driving area DA1 is described below in more detail with reference to FIGS. 4A and 4B.

As shown in FIG. 4A, a pixel electrode P11 is formed in an area defined by the gate line 110 arranged in the first direction and the date line 120 crossing the gate line 110. A gate electrode G extending from the gate line 110, a source electrode S extending from the date line 120, a drain electrode D connected to the pixel electrode P11, and an active layer A positioned between them constitute a thin film transistor (TFT). The first common line 113a1 is positioned parallel to the gate line 110 and thus crosses the date line 120. The first common line 113a1 is positioned adjacent to the gate line 110 and prevents or minimizes a reduction in an aperture ratio. The first common line 113a1 is electrically connected to the first common electrode 130a1 through the first contact hole CH2a.

As shown in FIG. 4B, the gate electrode G and the first common line 113a1 are formed on the first substrate SUBS1, and the gate insulating layer GI for insulating the gate electrode G and the first common line 113a1 is formed on the first substrate SUBS1. The active layer A is formed on the gate insulating layer GI. The source electrode S and the drain electrode D, each of which is connected to the active layer A, are formed on the gate insulating layer GI. The pixel electrode P11 connected to the drain electrode D is formed on the same level layer as the date line 120. The interlayer dielectric INS is formed on the source electrode S, the drain electrode D, and the pixel electrode P11. The first contact hole CH2a exposing the first common line 113a1 is formed in the interlayer dielectric INS. The first common electrode 130a1 is formed on the interlayer dielectric INS and is connected to the first common line 113a1. A plurality of slits or holes 'To' defined by the first common electrode 130a1 are formed above each pixel electrode.

The configuration of the pixel area PA3 of the first touch sensing area SA is described below in more detail with reference to FIGS. 5A and 5B.

As shown in FIG. 5A, a pixel electrode P12 is formed in an area defined by the gate line 110 arranged in the first direction and the date line 120 crossing the gate line 110. A gate electrode G extending from the gate line 110, a source electrode S extending from the date line 120, a drain electrode D connected to the pixel electrode P12, and an active layer A positioned between them constitute a thin film transistor (TFT). The second common line 123a1 is positioned parallel to the data line 120 and overlaps the data line 120, thereby minimizing a reduction in the aperture ratio resulting from the second common line 123a1. For instance, the second common line 123a1 can be formed over the data line 120 such that they are aligned with each other or substantially aligned with each other. The second common line 123a1 directly contacts the second common electrode 130b and is electrically connected to the second common electrode 130b. If multiple second common electrodes are present, the second common line may contact each of the second common electrodes and thereby electrically connect the second common electrodes.

As shown in FIG. 5B, the gate electrode G is formed on the first substrate SUBS1, and the gate insulating layer GI for insulating the gate electrode G is formed on the first substrate SUBS1. The active layer A is formed on the gate insulating layer GI. The source electrode S and the drain electrode D, each of which is connected to the active layer A, are formed on the gate insulating layer GI. The pixel electrode P12 connected to the drain electrode D is formed on the same level layer as the data line 120. The interlayer dielectric INS is formed on the source electrode S, the drain electrode D, the pixel electrode P12, and the data line 120. The second common electrode 130b is formed on the interlayer dielectric INS. The second common line 123a1 is formed on the second common electrode 130b and contacts the second common electrode 130b. The second common electrode 130b is positioned parallel to the data line 120 and overlaps the data line 120. The plurality of slits 'To' defined by the second common electrode 130b are formed above each pixel electrode.

The configuration of the pixel area PA2 of the first touch driving area DA1 is described below in more detail with reference to FIGS. 6A and 6B.

As shown in FIG. 6A, a pixel electrode P13 is formed in an area defined by the gate line 110 arranged in the first direction and the date line 120 crossing the gate line 110. A gate electrode G extending from the gate line 110, a source electrode S extending from the date line 120, a drain electrode D connected to the pixel electrode P13, and an active layer A positioned between them constitute a thin film transistor (TFT). The first common line 113a1 is positioned parallel to the gate line 110 and thus crosses the date line 120.

As shown in FIG. 6B, the gate electrode G and the first common line 113a1 are formed on the first substrate SUBS1, and the gate insulating layer GI for insulating the gate electrode G and the first common line 113a1 is formed on the first substrate SUBS1. The active layer A is formed on the gate insulating layer GI. The source electrode S and the drain electrode D, each of which is connected to the active layer A, are formed on the gate insulating layer GI. The pixel electrode P13 connected to the drain electrode D is formed on the same level layer as the date line 120. The interlayer dielectric INS is formed on the source electrode S, the drain electrode D, the pixel electrode P13, and the data line 120. The first common electrode 130a1 is formed on the interlayer dielectric INS. The plurality of slits 'To' defined by the first common electrode 130a1 are formed above each pixel electrode.

As described above, in the embodiment of the invention, each of the first common lines 113a1 and 113a2 is formed over the touch driving areas DA1 and DA2 of the first row and is connected to the first common electrodes 130a1 and 130a2 through one or two of the first contact holes CH2a, CH2b, CH2c, and CH2d positioned in the touch driving areas DA1 and DA2. Other configurations may be used for the embodiment of the invention. For example, the number of first common lines and the number of first contact holes in the touch driving areas may be properly adjusted, so as to reduce the resistance of the first common electrodes. For instance, each of the touch driving areas DA1 and DA2 can have three or more contact holes per touch driving area.

The first common electrodes 130a1, 130a2, 130a3, and 130a4 and the second common electrode 130b each have the plurality of slits To which elongate at a predetermined distance between them. A fringe field is formed between the pixel electrodes P11, P12, and P13 and the first and second common electrodes 130a1, 130a2, 130a3, 130a4, and 130b through the slits To of the first and second common electrodes 130a1, 130a2, 130a3, 130a4, and 130b, thereby making it possible to drive the liquid crystals in a fringe field switching mode.

In the example of FIG. 2, one pixel area includes three subpixel areas corresponding to red, green, and blue filters. Other configurations and other number of subpixels per pixel area may be used for the various embodiments of the invention. For example, the number of subpixel areas constituting one pixel area may be properly changed depending on types of color filters of the color filter array.

Figure 7A:
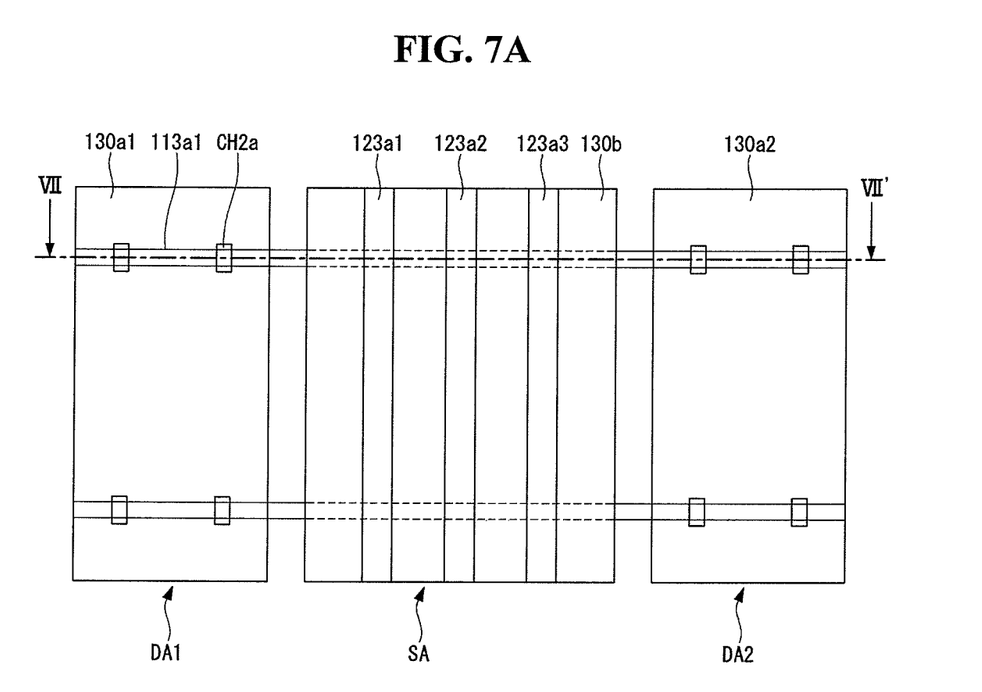
FIG. 7A is a schematic plane view of a touch sensor integrated type display device according to an example embodiment of the invention.
Figure 7B:
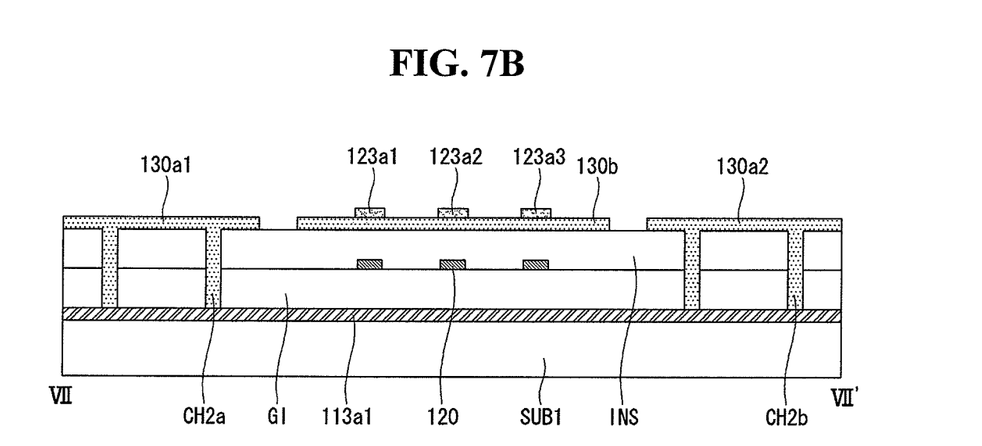
FIG. 7B is a cross-sectional view taken along line VII-VII' shown in FIG. 7A.

FIG. 7A is a schematic plane view of another example of the touch sensor integrated type display device according to an embodiment of the invention, and FIG. 7B is a cross-sectional view taken along line VII-VII' shown in FIG. 7A. The display device of FIG. 7A is the same as that of FIG. 1 with some variations as noted by the differences between FIG. 6B and FIG. 7B. For instance, three second common lines 123a1, 123a2 and 123a3 are provided.

As shown in FIGS. 7A and 7B, the first and second touch driving areas DA1 and DA2 are positioned on the substrate SUB1, and the first touch sensing area SA is positioned between the first and second touch driving areas DA1 and DA2. The first common line 113a1 is arranged in the first direction, is connected to both the first and second touch driving areas DA1 and DA2, and crosses the first touch sensing area SA. The gate insulating layer GI is formed on the first common line 113a1. The first common line 113a1 crosses the data lines 120 in the first touch sensing area SA of the gate insulating layer GI.

The interlayer dielectric INS is formed on the data lines 120, and the first common electrodes 130a1 and 130a2 and the second common electrode 130b are formed on the interlayer dielectric INS. The first common electrodes 130a1 and 130a2 are respectively formed in the first and second touch driving areas DA1 and DA2, and the second common electrode 130b is formed in the first touch sensing area SA. The plurality of first contact holes CH2a and CH2b are formed in the interlayer dielectric INS of the first and second touch driving areas DA1 and DA2. The first common electrodes 130a1 and 130a2 are electrically connected to the first common line 113a1 through the first contact holes CH2a and CH2b. The second common lines 123a1, 123a2, and 123a3 are formed on the second common electrode 130b of the first touch sensing area SA and are electrically connected to the second common electrode 130b.

In the touch sensor integrated type display device according to this embodiment of the invention, the second common lines 123a1, 123a2, and 123a3 respectively overlap the data lines 120 formed under the second common lines 123a1, 123a2, and 123a3, thereby preventing the reduction in the aperture ratio. For instance, the second common lines 123a1, 123a2, and 123a3 may be formed directly over the data lines 120 respectively such that the second common lines 123a1, 123a2, and 123a3 are aligned with the data lines 120 therebelow or substantially aligned with the data lines 120 therebelow.

A method for driving the touch sensor integrated type display device according to the embodiments of the invention is described below with reference to FIG. 1. This method is applied to the displays of FIGS. 1 and 7.

As shown in FIG. 1, the gate driver 210 sequentially outputs a gate pulse (or a scan pulse) under the control of the timing controller 204 in a display driving mode. The gate driver 210 shifts a swing voltage of the gate pulse to a gate high voltage VGH and a gate low voltage VGL. The gate pulse output from the gate driver 210 is synchronized with the data voltage output from the data driver 220 and is sequentially supplied to the gate lines 110. The gate high voltage VGH is equal to or greater than a threshold voltage of the TFT, and the gate low voltage VGL is less than the threshold voltage of the TFT. A plurality of gate driver integrated circuits (ICs) of the gate driver 210 may be connected to the gate lines 110 formed on the first substrate SUBS1 of the TFT array TFTA through a tape automated bonding (TAB) process. Alternatively, the gate driver ICs of the gate driver 210 may be directly formed on the first substrate SUBS1 of the TFT array TFTA along with pixels through a gate-in-panel (GIP) process.

The data driver 220 samples and latches digital video data RGB under the control of the timing controller 204. The data driver 220 converts the digital video data RGB into positive and negative gamma compensation voltages GMA1 to GMAn and inverts a polarity of the data voltage. The positive and negative data voltages output from the data driver 220 are synchronized with the gate pulses output from the gate driver 210. A plurality of source driver ICs of the data driver 220 may be connected to the data lines 120 formed on the first substrate SUBS1 of the TFT array TFTA through a chip-on glass (COG) process or the TAB process. The source driver ICs may be integrated inside the timing controller 204 and thus may be implemented as a single chip IC along with the timing controller 204.

The timing controller 204 generates timing control signals for controlling operation timings of the gate driver 210 and the data driver 220 using timing signals Vsync, Hsync, DE, and MCLK, which are received from the external host controller 200 and are used to drive the touch sensor integrated type liquid crystal display. The timing control signals include a gate timing control signal for controlling the operation timing of the gate driver 210 and a data timing control signal for controlling the operation timing of the data driver 220 and the polarity of the data voltage.

The gate timing control signal includes a gate start pulse GSP, a gate shift clock GSC, a gate output enable GOE, and the like. The gate start pulse GSP is applied to a first gate driver IC of the gate driver 210, which outputs a first gate pulse in each frame period, and controls a shift start timing of the first gate driver IC. The gate shift clock GSC is commonly input to the gate driver ICs of the gate driver 210 and shifts the gate start pulse GSP. The gate output enable GOE controls output timings of the gate driver ICs of the gate driver 210.

The data timing control signal includes a source start pulse SSP, a source sampling clock SSC, a polarity control signal POL, a source output enable SOE, and the like. The source start pulse SSP is applied to a first source driver IC of the data driver 220, which firstly samples the data, and controls a data sampling start timing. The source sampling clock SSC controls a sampling timing of data inside the source driver ICs based on a rising or falling edge thereof. The polarity control signal POL controls the polarity of the data voltage output from the source driver ICs. The source output enable SOE controls output timings of the source driver ICs. If the digital video data RGB is input to the data driver 220 through a mini low voltage differential signaling (LVDS) interface, the source start pulse SSP and the source sampling clock SSC may be omitted.

The power supply unit 202 is implemented as a DC-DC converter including a pulse width modulation (PWM) circuit, a boost converter, a regulator, a charge pump, a voltage divider, an operational amplifier, etc. The power supply unit 202 regulates a voltage input from the host controller 200 and generates voltages required to drive the display area DP, the gate driver 210, the data driver 220, the timing controller 204, and the backlight unit. The voltages generated by the power supply unit 202 include a high potential power voltage VDD, the gate high voltage VGH, the gate low voltage VGL, a common voltage Vcom, positive and negative gamma reference voltages VGMA1 to VGMAn, the pulse voltage Vtsp, and the like. The common voltage Vcom is supplied to the first common electrodes 130a1, 130a2, 130a3, and 130a4 and the second common electrode 130b and forms a fringe electric field along with the pixel electrodes P.

The first common electrodes 130a1, 130a2, 130a3, and 130a4 receive the pulse voltage Vtsp during a period in which the common voltage Vcom is not supplied, thereby serving as the touch driving electrodes for recognizing a touch input to the display. The supply timings of the common voltage Vcom and the pulse voltage Vtsp may be controlled by the host controller 200 or the timing controller 204.

The host controller 200 transfers the digital video data RGB of an input image and the timing signals Vsync, Hsync, DE, and MCLK used to drive the touch sensor integrated type liquid crystal display device to the timing controller 204 through an interface, such as the LVDS interface and a transition minimized differential signaling (TMDS) interface.

The touch driver 230 supplies the pulse voltage Vtsp generated by the power supply unit 202 to the first common electrodes 130a1, 130a2, 130a3, and 130a4 through the touch driving lines 113a and 130b and the first common lines 113a1, 113a2, 113b1, and 113b2. The pulse voltage Vtsp is sequentially supplied to the first common electrodes 130a1, 130a2, 130a3, and 130a4 based on each row. In other words, the pulse voltage Vtsp is supplied to the first common electrodes 130a1 and 130a2 positioned on the first row through the touch driving line 113a, the first common lines 113a1 and 113a2, and the first contact holes CH2a, CH2b, CH2c, and CH2d. Subsequently, the pulse voltage Vtsp is supplied to the first common electrodes 130a3 and 130a4 positioned on the second row through the touch driving line 113b, the first common lines 113b1 and 113b2, and the first contact holes CH2e, CH2f, CH2g, CH2h, CH2i, and CH2j.

The touch driver 230 does not supply the pulse voltage Vtsp to the first common electrodes of another row, except the first common electrodes, to which the pulse voltage Vtsp is currently supplied. For example, when the pulse voltage Vtsp is supplied to the first common electrodes 130a1 and 130a2 positioned on the first row, the pulse voltage Vtsp is not supplied to the first common electrodes 130a3 and 130a4 positioned on the second row. Further, a current path between the touch driver 230 and the first common electrodes 130a3 and 130a4 is opened in a floating state. On the other hand, when the pulse voltage Vtsp is supplied to the first common electrodes 130a3 and 130a4 positioned on the second row, the pulse voltage Vtsp is not supplied to the first common electrodes 130a1 and 130a2 positioned on the first row. Further, a current path between the touch driver 230 and the first common electrodes 130a1 and 130a2 is opened in a state where the pulse voltage Vtsp is not supplied.

The touch sensing driver 240 is connected to the second common electrode 130b through a touch sensing line 123a and the second common lines 123a1 and 123a2. When a touch input to the display device is generated, the touch sensing driver 240 senses changes in capacitances generated between the first common electrodes 130a1, 130a2, 130a3, and 130a4 and the second common electrode 130b and finds x and y coordinates of a touch position for the touch input.

As described above, the touch sensor integrated type display device according to the embodiments of the invention configures the common electrode so that it is divided into the first and second common electrodes and respectively uses the first and second common electrodes as the touch driving electrode and the touch sensing electrode. Hence, the thickness of the touch sensor integrated type display device according to the embodiment of the invention may be reduced.

Furthermore, in the touch sensor integrated type display device according to the embodiments of the invention, the size of each of the first and second common electrodes corresponds to the plurality of pixel areas, the first common electrodes are connected to one another using at least one first common line based on each row, and the second common electrode is connected to at least one second common line based on each column. Hence, the resistance of the first and second common electrodes may be reduced, and the touch sensitivity may be improved.

Furthermore, in the touch sensor integrated type display device according to the embodiments of the invention, each of one or more second common line is positioned parallel to the corresponding data line and overlaps the data line. Hence, the reduction in the aperture ratio resulting from the presence of the second common line may be prevented or minimized.

Although embodiments have been described with reference to a number of illustrative embodiments thereof, it should be understood that numerous other modifications and embodiments can be devised by those skilled in the art that will fall within the scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A touch sensor integrated type display device comprising:
   a plurality of gate lines and a plurality of data lines formed on a substrate to cross each other;
   a display area including a plurality of pixel electrodes for displaying images;
   a common electrode including at least two touch driving electrodes overlapping the plurality of pixel electrodes and at least one touch sensing electrode positioned adjacent to the at least two touch driving electrodes, for recognizing a touch input to the display area;
   at least one first signal line electrically connected to the at least two touch driving electrodes; and
   at least one second signal line electrically connected to and formed on the at least one touch sensing electrode, and overlapping at least one of the data lines,
   wherein the at least one first signal line is disposed parallel to the gate lines, and the at least one second signal line is disposed parallel to the data lines.

2. The touch sensor integrated type display device of claim 1, wherein each of the at least one second signal line is substantially aligned with at least one of the data lines.

3. The touch sensor integrated type display device of claim 1, wherein the at least one second signal line includes a plurality of second signal lines substantially and respectively aligned with the data lines.

4. The touch sensor integrated type display device of claim 1, wherein the at least one touch sensing electrode is disposed between the at least two touch driving electrodes, and
wherein the at least one touch sensing electrode and the at least two touch driving electrodes extend to substantially cover the display area.

5. The touch sensor integrated type display device of claim 1, wherein the at least one second signal line crosses over the at least one first signal line without contacting each other.

6. The touch sensor integrated type display device of claim 1, wherein the at least two touch driving electrodes are formed over the at least one first signal line, and contact the at least one first signal line through at least two contact holes defined by an interlayer dielectric layer formed on the substrate.

7. The touch sensor integrated type display device of claim 1, wherein the at least one first signal line includes a plurality of first signal lines extending parallel to each other, and
wherein the touch sensor integrated type display device further comprises:
a touch driver configured to sequentially supply at least one pulse signal to each of the first signal lines, and
a touch sensing driver configured to sense the touch input by detecting an output of the at least one second signal line in response to the supplied at least one pulse signal.

8. The touch sensor integrated type display device of claim 1, wherein the common electrode and the pixel electrodes control an orientation of liquid crystal cells to display the images.

9. The touch sensor integrated type display device of claim 1, wherein a size and a number of each of the at least one touch sensing electrode and the at least two touch driving electrodes are varied based on a size of a touch area by a finger and a size of the display area.

10. The touch sensor integrated type display device of claim 1, wherein the at least one second signal line is formed directly on the at least one touch sensing electrode.

11. A touch sensor integrated type display device comprising:
a gate line and at least one first signal line formed on a substrate;
a gate insulating layer formed on the gate line;
a data line formed on the gate insulating layer to cross the gate line;
a thin film transistor formed on the gate insulating layer and including a source electrode connected to the data line and a drain electrode;
a pixel electrode formed on the gate insulating layer so that the pixel electrode is connected to the drain electrode of the thin film transistor, and is formed in an area defined by a crossing of the gate line and the data line;
an interlayer dielectric layer formed on the gate insulating layer on which the data line, the thin film transistor, and the pixel electrode are formed;
a common electrode formed on the interlayer dielectric layer, the common electrode including at least two touch driving electrodes and at least one touch sensing electrode separating the at least two touch driving electrodes,
wherein the at least two touch driving electrodes are connected to the at least one first signal line through contact holes defined by the interlayer dielectric layer; and
at least one second signal line electrically connected to and formed on the at least one touch sensing electrode and overlapping the data line,
wherein the at least one first signal line is disposed parallel to the gate line, and the at least one second signal line is disposed parallel to the data line.

12. The touch sensor integrated type display device of claim 11, wherein the at least one second signal line is substantially aligned with at least one data line formed on the gate insulating layer.

13. The touch sensor integrated type display device of claim 11, wherein the at least one second signal line includes a plurality of second signal lines substantially and respectively aligned with a plurality of data lines formed on the gate insulating layer.

14. The touch sensor integrated type display device of claim 11, wherein the at least one touch sensing electrode and the at least two touch driving electrodes extend to substantially cover a display area of the touch sensor integrated type display device.

15. The touch sensor integrated type display device of claim 11, wherein the at least one second signal line crosses over the at least one first signal line without contacting each other.

16. The touch sensor integrated type display device of claim 11, wherein the at least one first signal line includes a plurality of first signal lines, and the at least one second signal line includes a plurality of second signal lines disposed substantially perpendicular to the plurality of first signal lines.

17. The touch sensor integrated type display device of claim 11, wherein the at least one first signal line includes a plurality of first signal lines extending parallel to each other, and
wherein the touch sensor integrated type display device further comprises:
a touch driver configured to sequentially supply at least one pulse signal to each of the first signal lines, and
a touch sensing driver configured to sense a touch input by detecting an output of the at least one second signal line in response to the supplied at least one pulse signal.

18. The touch sensor integrated type display device of claim 11, wherein the common electrode along with the pixel electrode control an orientation of liquid crystal cells to display images.

19. The touch sensor integrated type display device of claim 11, wherein a size and a number of each of the at least one touch sensing electrode and the at least two touch driving electrodes are varied based on a size of a touch area by a finger and a size of a display area of the touch sensor integrated type display device.

20. The touch sensor integrated type display device of claim 11, wherein the at least one second signal line is formed directly on the at least one touch sensing electrode.

* * * * *